United States Patent
Dahlman

(10) Patent No.: US 9,239,076 B2
(45) Date of Patent: Jan. 19, 2016

(54) METHOD OF MAKING A BEARING RING, A BEARING RING AND A BEARING

(75) Inventor: Patrik Dahlman, Shanghai (CN)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 13/807,998

(22) PCT Filed: May 27, 2011

(86) PCT No.: PCT/SE2011/000099
§ 371 (c)(1),
(2), (4) Date: Mar. 21, 2013

(87) PCT Pub. No.: WO2012/002868
PCT Pub. Date: Jan. 5, 2012

(65) Prior Publication Data
US 2013/0209015 A1    Aug. 15, 2013

(30) Foreign Application Priority Data
Jul. 2, 2010    (SE) .................................... 1000722

(51) Int. Cl.
*F16C 33/30* (2006.01)
*B23K 11/04* (2006.01)
*C21D 9/40* (2006.01)
*C23C 8/02* (2006.01)
*C23C 8/04* (2006.01)
*C23C 8/22* (2006.01)
*C23C 8/80* (2006.01)
*F16C 33/64* (2006.01)

(52) U.S. Cl.
CPC .................. *F16C 33/30* (2013.01); *B23K 11/04* (2013.01); *C21D 9/40* (2013.01); *C23C 8/02* (2013.01); *C23C 8/04* (2013.01); *C23C 8/22* (2013.01); *C23C 8/80* (2013.01); *F16C 33/64* (2013.01); *F16C 2204/62* (2013.01); *F16C 2220/44* (2013.01); *F16C 2223/12* (2013.01); *F16C 2226/36* (2013.01); *F16C 2300/14* (2013.01)

(58) Field of Classification Search
CPC .......... F16C 33/30; F16C 33/64; F16C 33/60; F16C 33/14; F16C 33/58; F16C 33/513; F16C 43/04; F16C 2326/02; F16C 2223/12; F16C 2226/36; C21D 9/90; B23K 11/04; C23C 8/02; C23C 8/04; C23C 8/22; C23C 8/80
USPC ....................................... 29/898.04
See application file for complete search history.

(56) References Cited

U.S. PATENT DOCUMENTS 3,692,374 A * 9/1972 Scheifele ...................... 384/570

FOREIGN PATENT DOCUMENTS

| CN | 1082477 A | 2/1994 |
| CN | 1597231 A | 3/2005 |

(Continued)

*Primary Examiner* — Moshe Wilensky
(74) *Attorney, Agent, or Firm* — Bryan Peckjian; SKF USA Inc. Patent Dept.

(57) ABSTRACT

Method for manufacturing a bearing ring (14, 34, 36) from at least one steel bar (12) having ends. The method comprises the steps of forming said at least one steel bar (12) into at least one ring segment and flash butt welding the ends (12a, 12b) of said at least one ring segment to make a ring. The method also comprises the step of carburizing at least part (C) of a surface (12c, 12d) of said at least one steel bar (12) which is adjacent to said surface (12a, 12b) that is to be flash butt welded prior to said flash butt welding.

10 Claims, 4 Drawing Sheets

(56) References Cited

FOREIGN PATENT DOCUMENTS

| | | | |
|---|---|---|---|
| EP | 1400606 | A1 | 3/2004 |
| GB | 1141901 | A | 2/1969 |
| GB | 2209058 | A | 4/1989 |
| JP | 2007070696 | A | 3/2007 |

* cited by examiner

METHOD OF MAKING A BEARING RING, A BEARING RING AND A BEARING

CROSS-REFERENCE TO RELATED APPLICATION

This application is a National Stage application claiming the benefit of International Application Number PCT/SE2011/000099 filed on 27 May 2011, which claims the benefit of SE Application 1000722-7 Filed on 2 Jul. 2010.

TECHNICAL FIELD

The present invention relates to a roller bearing ring comprising an additional component enclosed in the ring material. The invention further relates to a method for producing a bearing ring with an enclosed additional component in a cost-effective way.

BACKGROUND OF THE INVENTION

Flash-butt welding, or "flash welding" is a resistance welding technique for joining segments of metal rail, rod, chain or pipe in which the segments are aligned end to end and electronically charged, producing an electric arc that melts and welds the ends of the segments, yielding an exceptionally strong and smooth joint.

A flash butt welding circuit usually consists of a low-voltage, high-current energy source (usually a welding transformer) and two clamping electrodes. The two segments that are to be welded are clamped in the electrodes and brought together until they meet, making light contact. Energizing the transformer causes a high-density current to flow through the areas that are in contact with each other. Flashing starts, and the segments are forged together with sufficient force and speed to maintain a flashing action. After a heat gradient has been established on the two edges to be welded, an upset force is suddenly applied to complete the weld. This upset force extrudes slag, oxides and molten metal from the weld zone leaving a welding accretion in the colder zone of the heated metal. The joint is then allowed to cool slightly before the clamps are opened to release the welded article. The welding accretion may be left in place or removed by shearing while the welded article is still hot or by grinding, depending on the requirements.

A welded bearing ring may be subjected to a post-welding heat treatment, such as carburizing, in order to increase its surface hardness, wear resistance and/or fatigue and tensile strength. Carburizing is a heat treatment process in which an iron or steel component is heated in the presence of another material that liberates carbon as it decomposes. The outer surface of the component will have a higher carbon content than the original material. When the iron or steel component is cooled rapidly by quenching, the higher carbon content on the outer surface becomes hard, while the core remains soft (i.e. ductile) and tough.

SUMMARY OF THE INVENTION

An object of the invention is to provide an improved method for manufacturing a bearing ring from at least one steel bar.

This object is achieved by a method comprising the steps of forming the at least one steel bar into at least one ring segment and flash butt welding the ends of the at least one ring segment to make a ring. The method also comprises the step of carburizing at least part of a surface of the at least one steel bar in the vicinity of the subsequent butt weld joint, which surface is adjacent to the surface that is to be flash butt welded, prior to said flash butt welding. A ring is therefore constructed from a single ring segment that constitutes the entire ring once the ends of the ring segment have been flash butt welded together. Alternatively a ring is constructed from a plurality of ring segments each constituting part of the ring, whereby an entire ring is formed once the ends of adjacent ring segments have been flash butt welded together.

Since the method comprises the step of carburizing at least part of a surface of at least one steel bar, which surface is adjacent to the surface that is to be flash butt welded, prior to the flash butt welding step, carbon at that surface will be carried towards the colder zone of the heated metal, i.e. towards the inside and outside surfaces of a welded bearing ring or welded bearing ring segments, which may subsequently constitute raceway surfaces, rather than remain in the vicinity of the weld joint. The displaced carbon will therefore further increase the surface hardness, wear resistance and/or fatigue and tensile strength of the welded bearing ring/ring segment at its inside and outside surfaces. Such a method provides a welded bearing ring having a superior weld joint that is free, or substantially free of carbon, and without areas of structural weakness as might otherwise occur. Such a method consequently provides an improved welded bearing ring having a high degree of structural integrity.

According to an embodiment of the invention the step of carburizing at least one part of a surface of the at least one steel bar is carried out prior to forming the at least one steel bar into at least one ring segments. If carburizing is carried out prior to forming the at least one steel bar, a greater number of steel bars may be simultaneously carburized in a carburizing furnace of a certain volume as compared to the number of bearing rings or bearing ring segments that can be simultaneously carburized in the carburizing furnace. Manufacturing time, costs and complexity may thereby be decreased. This is especially true for large sized bearing rings (having a diameter of 0.5 m, 1 m, 2 m, 3 m or even larger than 3 m), in which case it is not only manufacturing time, costs and complexity that are decreased but also space requirements, i.e. the size of the factory and the furnaces needed may be decreased.

According to another embodiment of the invention the method comprises the step of forming a plurality of steel bars into ring segments where each ring segment constitutes 50%, 25%, 15% or less than 15% of a ring when said ring segments have been flash butt welded together to make a ring. It should be noted that a plurality of ring segments of different sizes may alternatively be flash butt welded together to make a ring.

According to another embodiment of the invention the method comprises the step of profiling the at least one steel bar before it is formed into at least one ring segment. In the step of profiling the at least one steel bar, the at least one steel bar may be cut to the required dimensions using a method such as flame cutting, laser cutting, water jet cutting or plasma cutting. According to an embodiment of the present invention the carburizing step is carried out prior to the profiling step.

According to an embodiment of the invention the step of carburizing at step includes uniformly or non-uniformly carburizing at least one of the following: at least one part of a surface of the at least one steel bar which is adjacent to a surface that is to be flash butt welded, an entire surface of the at least one steel bar which is adjacent to a surface that is to be flash butt welded, or all of the surfaces of the at least one steel bar.

According to a further embodiment of the invention the at least one steel bar comprises steel having a carbon content of, 0.10 to 1.10 weight-%, preferably 0.2 to 0.7 weight-%, most preferably 0.2-0.4 weight-%.

According to an embodiment of the invention the method comprises the step of removing any welding accretion, containing slag, oxides and/or molten metal for example, after the flash butt welding step.

The present invention also concerns a bearing ring manufactured by forming at least one steel bar having ends into at least one ring segment, by bending for example, and flash butt welding the ends of the at least one ring segment to make a ring. A radial cross section through a flash butt weld joint exhibits an increased carburization depth at a flash butt weld joint, i.e. the depth of the carburized layer in the vicinity of the flash butt weld is greater than the carburized layer in part of the bearing ring that has not been flash butt welded, only carburized.

According to an embodiment of the invention the bearing ring constitutes an inner or outer ring of a bearing.

The present invention also concerns a bearing that comprises a bearing ring according to any of the embodiments of the invention. The bearing may be a roller bearing, a needle bearing, a tapered roller bearing, a spherical roller bearing, a toroidal roller bearing, a thrust bearing or a bearing for any application in which is subjected to alternating Hertzian stresses, such as rolling contact or combined rolling and sliding. The bearing may for example be used in automotive wind, marine, metal producing or other machine applications which require high wear resistance and/or increased fatigue and tensile strength.

BRIEF DESCRIPTION OF THE DRAWINGS

The present invention will hereinafter be further explained by means of non-limiting examples with reference to the appended schematic figures where.

It should be noted that the drawings have not been drawn to scale and that the dimensions of certain features have been exaggerated for the sake of clarity.

DETAILED DESCRIPTION OF EMBODIMENTS

Figure 1:
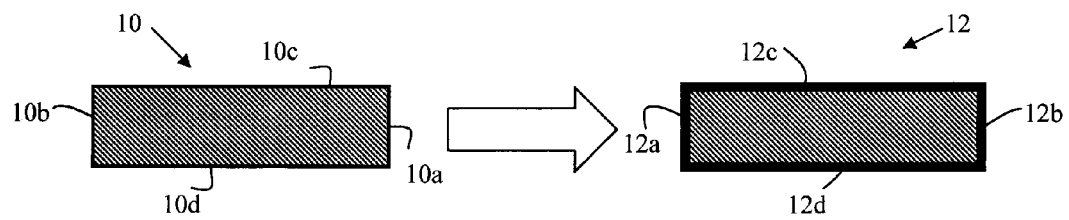
FIGS. 1-3 show steps of a method according to an embodiment of the invention.
Figure 2:
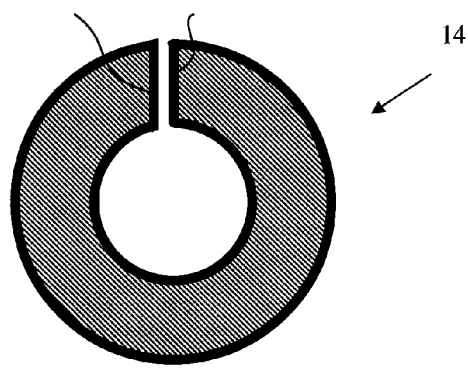
Figure 3:
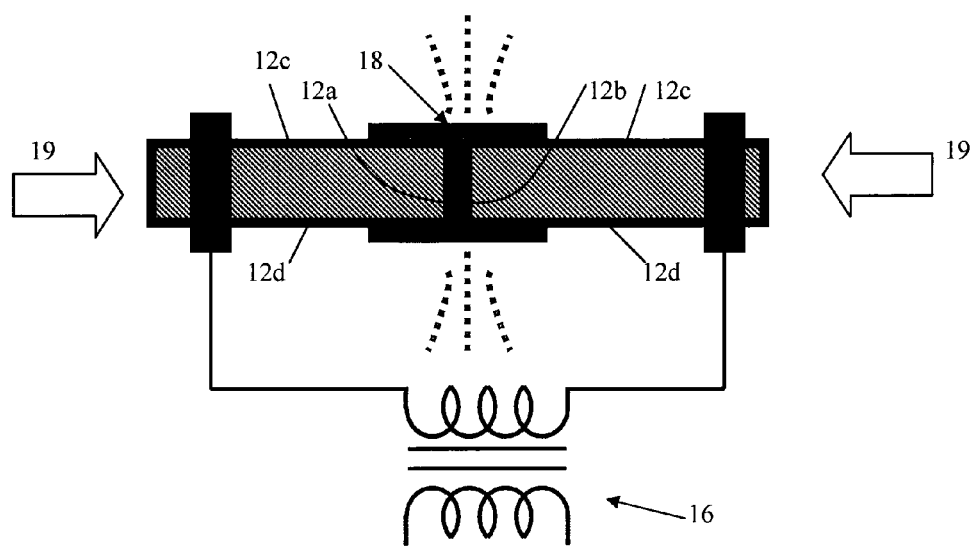

FIGS. 1-3 show various method steps of a method according to an embodiment of the invention. FIG. 1 shows that a steel bar 10 comprising steel, having two opposed ends and a carbon content of 0.2-0.4 weight-%, is firstly carburized to obtain a carburized steel bar 12. In the illustrated embodiment the entire surface of the steel bar 10 has been carburized. Just one part of one or more surfaces of the steel bar 10 may however be carburized. For example end surfaces 10a, 10b of the steel bar 10 that are to be welded together and part of side surfaces 10c and 10d closest to the end surfaces 10a and 10b may be carburized. At least part of the surfaces 10a, 10b, 10c, 10d of the steel bar 10 may namely be carburized uniformly or non-uniformly to form a continuous or non-continuous carburized layer using any conventional method in which the steel bar is heated in the presence of another material that liberates carbon as it decomposes and then cooled rapidly by quenching.

It should be noted that the ends 12a, 12b of the steel bars 12 shown in the illustrated embodiments comprise ends that form an angle of 90° to a side surface 12c, 12d of the steel bars 12. A steel bar 12 may however comprise an end 12a, 12b that forms an angle greater or less than 90° to a side surface 12c, 12d of a steel bar, a steel bar 12 may namely comprise diagonally sloping ends.

According to an alternative embodiment of the invention a steel bar 10 may be formed into an open bearing ring or a bearing ring segment and at least part of at least one surface of the open bearing ring or bearing ring segment may be carburized before the ends of the open bearing ring/bearing ring segment are flash butt welded to make a ring.

FIG. 2 shows a carburized steel bar 12 that has been formed into an open bearing ring 14 having two carburized ends 12a, 12b. It should be noted that the carburized steel bar 12 may alternatively be formed into a ring segment whereby two or more ring segments may then be flash butt welded together to form a bearing ring.

Figure 4:
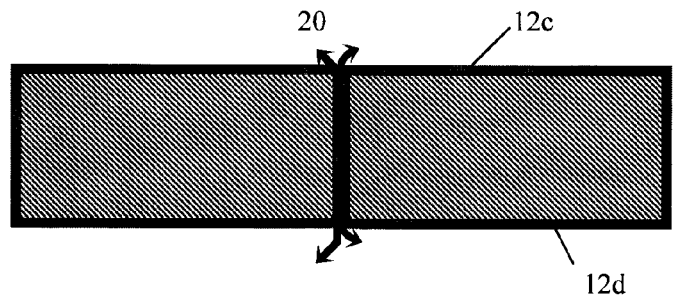
FIG. 4 shows the movement of carbon in the vicinity of a weld joint during a flash butt welding step of a method according to an embodiment of the invention.

FIG. 3 shows the carburized ends 12a, 12b of an open bearing ring being flash butt welded together. The carburized ends 12a, 12b of the open bearing ring 14 are clamped and brought together at a controlled rate and current from a transformer 16 is applied. An arc is created between the two carburized ends 12a, 12b. At the beginning of the flash butt welding process, the arc gap 18 is large enough to even out and clean the two carburized surfaces 12a, 12b. Reducing and then closing and opening the gap 18 creates heat in the two carburized surfaces 12a, 12b. When the temperature at the two carburized surfaces 12a, 12b has reached the forging temperature, pressure is applied in the directions of block arrows 19 in FIG. 3 (or a moveable end is forged against a stationary end). A flash is created between the two carburized surfaces 12a, 12b, which causes carbon in the welding area to flow radially outwards from the surfaces 12a, 12b towards the inside and outside surfaces 12c, 12d of the bearing ring, as indicated by arrows 20 in FIG. 4, resulting in a clean weld joint.

After cooling in a water-, oil- or polymer-based quench for example, any welding accretion 22 (shown in FIG. 5) which accumulates on the inner and outer surfaces 12d and 12c of the welded bearing ring may be removed. According to an embodiment of the invention the welded bearing ring may be subjected to a second heat treatment and upsetting force to further improve its structural integrity.

Figure 5:
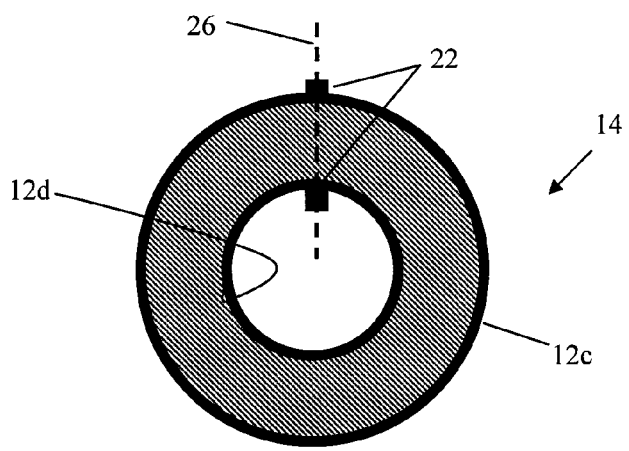
FIG. 5 shows a bearing ring after a flash butt welding step according to an embodiment of the invention.
Figure 6:
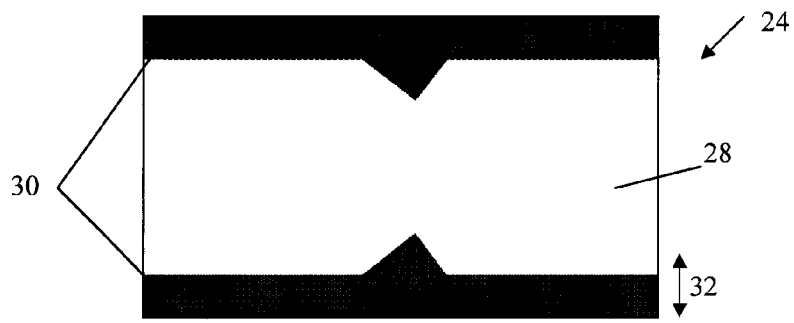
FIG. 6 shows a radial cross section of a bearing ring according to an embodiment of the invention.

FIG. 6 shows a radial cross section 24 through a flash butt weld joint of a bearing ring according to the present invention, i.e. a radial cross section obtained by cutting a bearing ring along line 26 shown in FIG. 5. The radial cross section 24 shows a core area comprising un-carburized material 28 and carburized surface layers 30 of substantially uniform thickness. An increased carburization depth 32 is however discernable in the vicinity of the flash butt weld joint.

Figure 7:
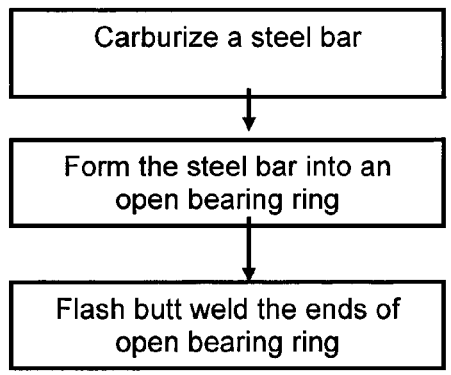
FIG. 7 shows the steps of a method according to an embodiment of the invention.

FIG. 7 shows various steps of a method for manufacturing a bearing ring from a steel bar according an embodiment of the present invention. The method comprises the steps of carburizing at least part of at least one surface of a steel bar having ends, forming the steel bar into an open bearing ring and flash butt welding the ends of the open bearing ring. The steel bar may be profiled before it is formed into the ring, whereby the step of carburizing at least part of the steel bar may be carried out prior to or after the profiling step.

Figure 8:
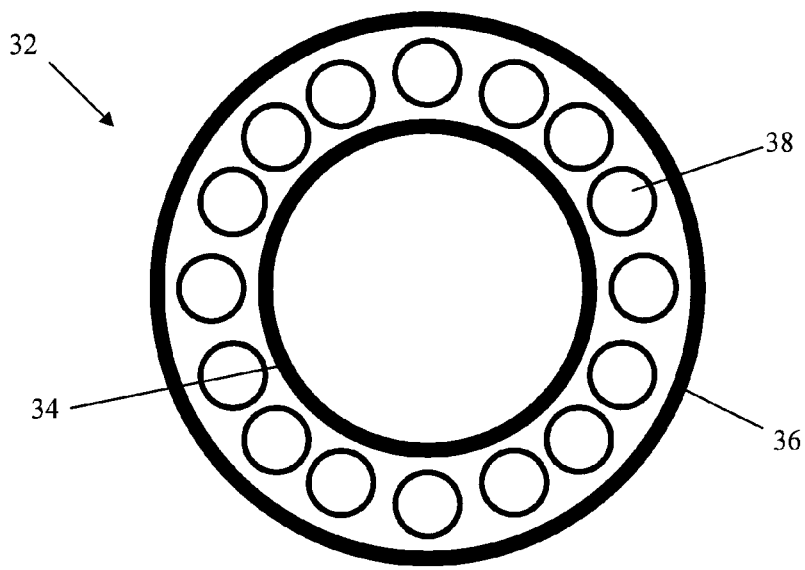
FIG. 8 shows a bearing according to an embodiment of the invention.

FIG. 8 shows an example of a bearing 32, namely a rolling element bearing that may range in size from 10 mm diameter to a few meters diameter and have a load-carrying capacity from a few tens of grams to many thousands of tonnes. The bearing 32 according to the present invention may namely be of any size and have any load-carrying capacity. The bearing 32 has an inner ring 34 and an outer ring 36, one or both of which may be constituted by a bearing ring according to the present invention, and a set of rolling elements 38. The inner ring 34, the outer ring 36 and/or the rolling elements 38 of the rolling element bearing 32, and preferably all of the rolling contact parts of the rolling element bearing 32 are manufactured from steel that comprises 0.20 to 0.40 weight-% carbon.

Figure 9:
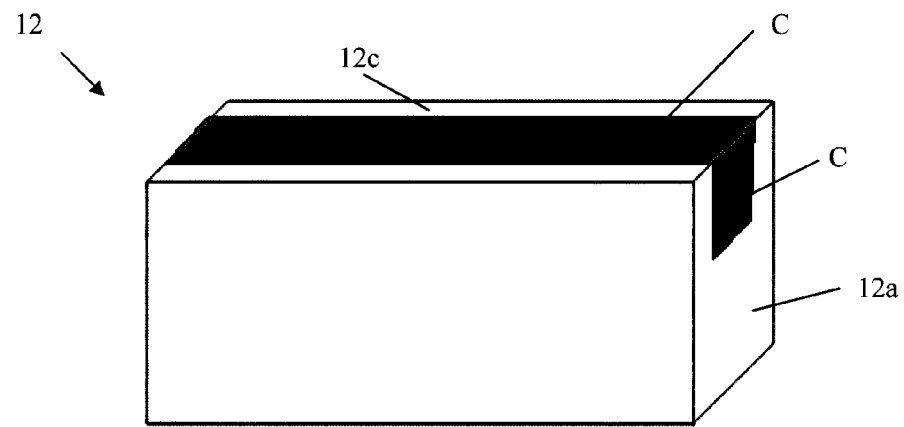
FIGS. 9-11 show parts of a steel bar that may be carburized according to different embodiments of the invention.

FIG. 9 shows a steel bar 12 where at least part (C) of an end surface 12a (that is to be flash butt welded) and part (C) of a side surface 12c have been carburized, whereby the parts of the end surface 12a and the side surface 12c which have been carburized are adjacent to each other.

Figure 10:
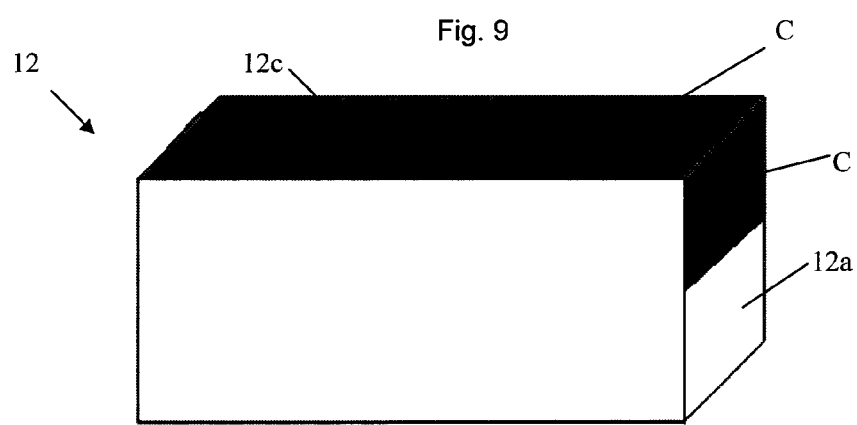

FIG. 10 shows a steel bar 12 where at least part (C) of an end surface 12a (that is to be flash butt welded) and the entire side surface 12c have been carburized.

Figure 11:
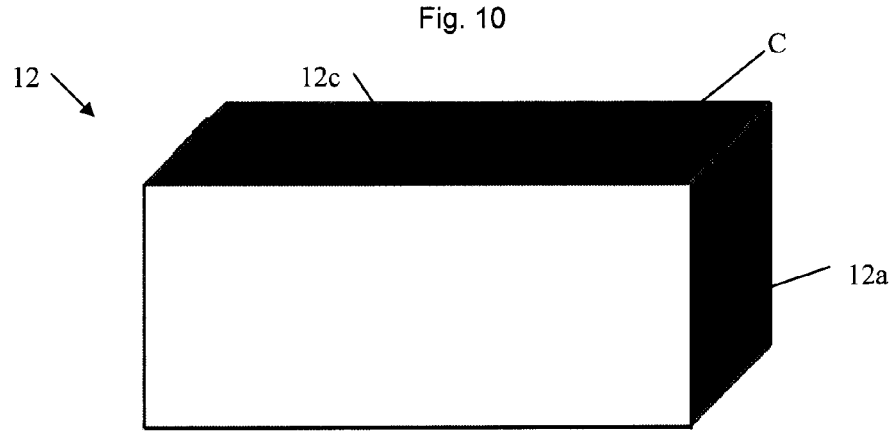

FIG. 11 shows a steel bar 12 where then entire end surface 12a (that is to be flash butt welded) and the entire side surface 12c have been carburized.

It should be noted that the parts (C) of the end surface 12a and the side surface 12c which have been carburized need not necessarily be adjacent to each other as shown in the illustrated embodiments. It should also be noted that the carburized parts (C) need not necessarily form a uniform continuous layer as shown in the illustrated embodiments, i.e. the carburizing depth over a carburized surface may vary, and one or more masks may for example be used so as to carburize only one or more parts of a surface that is to be carburized.

Further modifications of the invention within the scope of the claims will be apparent to a skilled person.

The invention claimed is:

1. A method for manufacturing a bearing ring from at least one steel bar having ends, the method comprising steps of:
    forming said at least one steel bar into at least one ring segment, and
    flash butt welding said ends of said at least one ring segment to make a ring, and
    carburizing at least part of a surface of said at least one steel bar, which surface is adjacent to a surface that is to be flash butt welded, prior to said flash butt welding,
    wherein the step of flash butt welding comprises creating a flash between carburized surfaces of said at least one steel bar and causing carbon to flow radially outwards from said carburized surfaces.

2. The method according to claim 1, further comprising a step of carburizing at least a part of a surface of said at least one steel bar, wherein said surface is to be flash butt welded.

3. The method according to claim 1, wherein said carburizing step is carried out prior to forming said at least one steel bar into said at least one ring segment.

4. The method according to claim 1, further comprising a step of forming a plurality of steel bars into a plurality of ring segments where each ring segment constitutes one of 50%, 25%, 15% or less than 15% of a complete ring circumference when said ring segments have been flash butt welded together to make said ring.

5. The method according to claim 1, further comprising a step of profiling said at least one steel bar before it is formed into said at least one ring segment.

6. The method according to claim 1, wherein said carburizing step includes carburizing at least one of the following:
    at least one part of a surface of said at least one steel bar which is adjacent to a surface that is to be flash butt welded,
    an entire surface of said at least one steel bar which is adjacent to a surface that is to be flash butt welded, and
    all of said surfaces of said at least one steel bar.

7. The method according to claim 1, wherein said steel bar comprises steel having a carbon content of between 0.1 and 1.1 weight-%.

8. The method according to claim 1, further comprising a step of removing any welding accretion after said flash butt welding step.

9. The method according to claim 1, wherein said steel bar comprises steel having a carbon content from 0.2 through 0.7 weight-%.

10. The method according to claim 1, wherein said steel bar comprises steel having a carbon content from 0.2 through 0.4 weight-%.

* * * * *